US009886955B1

(12) United States Patent
Tetreault et al.

(10) Patent No.: US 9,886,955 B1
(45) Date of Patent: Feb. 6, 2018

(54) ARTIFICIAL INTELLIGENCE FOR INFRASTRUCTURE MANAGEMENT

(71) Applicant: EMC IP Holding Company LLC, Hopkinton, MA (US)

(72) Inventors: Brian R. Tetreault, Upton, MA (US); Megan R. Ahigian, East Walpole, MA (US); Daniel K. O'Reilly, Jr., Framingham, MA (US); Michael J. Burns, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/196,592

(22) Filed: Jun. 29, 2016

(51) Int. Cl.
*G10L 15/00* (2013.01)
*G10L 15/26* (2006.01)
*G06F 17/28* (2006.01)
*G06F 17/30* (2006.01)
*G06F 17/27* (2006.01)

(52) U.S. Cl.
CPC .......... *G10L 15/26* (2013.01); *G06F 17/2705* (2013.01); *G06F 17/28* (2013.01); *G06F 17/30979* (2013.01)

(58) Field of Classification Search
CPC .......... G10L 15/00; G10L 15/06; G10L 15/08; G10L 15/20; G10L 15/22; G10L 15/26; G10L 15/28
USPC ............... 704/235, 231, 1, 9, 10, 251, 257
See application file for complete search history.

(56) References Cited

U.S. PATENT DOCUMENTS

| | | | | |
|---|---|---|---|---|
| 8,601,025 B1* | 12/2013 | Shajenko | .......... | G06F 17/30958 707/720 |
| 2003/0182391 A1* | 9/2003 | Leber | ................ | G06F 17/30864 709/217 |
| 2004/0083092 A1* | 4/2004 | Valles | ................. | G06F 17/2785 704/9 |
| 2007/0282595 A1* | 12/2007 | Tunning | ................ | G06F 3/0481 704/9 |

OTHER PUBLICATIONS

Apple Press Info, "Apple Launches iPhone 45, iOS 5 & iCloud," Press Releases, Oct. 4, 2011.
OpenNLP, The Apache Software Foundation, "Welcome to Apache OpenNLP," http://www.apache.org/, 2010.

* cited by examiner

*Primary Examiner* — Qi Han
(74) *Attorney, Agent, or Firm* — Murihead and Saturnelli LLC

(57) ABSTRACT

Described are techniques for performing system management such as a system including one or more data storage systems or appliances. User input may be received by a chat processing engine. The user input may be a natural language input to perform a request. The user input may be received from a management application used to perform data storage management. The chat processing engine may perform first processing of the user input to determine a response to the request. The response may be sent to the management application. The natural language input from a user may be in the form of text or voice that is converted to text for processing by the chat processing engine.

18 Claims, 6 Drawing Sheets

ARTIFICIAL INTELLIGENCE FOR INFRASTRUCTURE MANAGEMENT

BACKGROUND

Technical Field

This application generally relates to system management such as in connection with data storage systems, storage appliances and/or components.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing system management comprising: receiving first user input by a chat processing engine, wherein said first user input is a natural language input to perform a request and is received from a management application used to perform data storage management; performing, by the chat processing engine, first processing of the first user input to determine a response to the request; and sending the response to the management application. The management application may perform data storage management of any of at least one data storage system and at least one data storage appliance, and wherein the first user input includes any of a data storage management command or a data storage management query. The method may include receiving first voice input; and performing voice to text conversion of the first voice input and generating the first user input comprising text of a natural language. The natural language input may include text having a structure based on rules of a written or spoken human language. The first processing may include: determining whether the first user input matches a predetermined pattern associated with at least one command, query, operation or task; and responsive to determining the first user input matches the predetermined pattern, determining that the first user input is requesting to perform the at least one command, query, operation or task associated with the predetermined pattern. The predetermined pattern may be a first of a plurality of predetermined patterns associated with multiple candidate actions including any of: multiple commands, multiple queries, multiple operations and multiple tasks, and the method may include the user selecting one of the multiple candidate actions to be taken in connection with servicing the request. Each of the plurality of predetermined patterns may include any of: one or more predetermined keywords, one or more phrases, and one or more punctuation marks. The method may include forming the response, wherein the response includes a natural language response asking for confirmation that the first user input is requesting to perform the at least one command, query, operation or task associated with the predetermined pattern. The method may include performing second processing to service the request to perform the at least one command, query, operation or task associated with the predetermined pattern. The first user input may be received at a first data storage component that is any of a data storage system and a data storage appliance having storage managed using the management application. The second processing may include performing any one or more of: performing a first call in accordance with a first application programming interface to obtain first information internal within the first data storage component, said first information used in connection with servicing the request; performing a second call in accordance with a second application programming interface to obtain second information from another component that is external from the first data storage component and included in a same local area network as the first data storage component, said second information used in connection with servicing the request; obtaining third information from a system database, said third information including any of: current data storage system configuration information describing physical and logical entities in a data storage network comprising the first data storage component, and historical information denoting previously observed state information of components of a data storage network comprising the first data storage component, said third information used in connection with servicing the request; and obtaining fourth information over an available public network, said fourth information used in connection with servicing the request. The second processing may include determining any of a category and an attribute associated with the request; and querying a chat processing engine database for an existing context that matches the request. The first user input may be received from a first user of the management application, and the existing context may include information for one or more previous sessions of the first user with the management application regarding any of a same command, same query, same operation, same task, same category, and same attribute of the request. The first processing may include performing natural language processing of the first user input. The natural language processing may include parsing the first user input and determining one or more nouns and one or more verbs; determining, based on the parsing, at least one command, query, operation or task being requested by the first user input; and performing second processing to service the request in accordance with the at least one command, query, operation or task requested by the first user input. The first user input may be received at a first data storage component that is any of a data storage system and a data storage appliance having storage managed using the management application. The second processing may include performing any one or more of: performing a first call in accordance with a first application programming interface to obtain first information internal within the first data storage component, said first information used in connection with servicing the request; performing a second call in accordance with a second application programming interface to obtain second information from another component that is external from the first data storage component and included in a same local area network as the first data storage component, said second information used in connection with servicing the request; obtaining third information from a system database, said third information including any of: current data storage system configuration information describing physical and logical entities in a data storage network comprising the first data storage component, and historical information denoting previously observed state information of components of a data storage network comprising the first data storage component, said third information used in connection with servicing the request; and obtaining fourth information over an available public network, said fourth information used in connection with servicing the request. The second processing may include determining any of a category and an attribute associated with the request; and querying a chat processing engine database for an existing context that matches the request. The first user input may be received from a first user of the management application. The existing context may include information for one or more previous sessions of the first user with the management application regarding any of a same command, same query, same operation, same task, same category, and same attribute of the request.

In accordance with another aspect of the techniques herein is a system comprising: a client system including a data storage system management application executing on a processor of the client system; and a data storage system component including one or more processors and a memory, wherein the memory include code that, when executed, performs a method of system management comprising: receiving first user input by a chat processing engine, wherein said first user input is a natural language input to perform a request and is received from the data storage system management application used to perform data storage management; performing, by the chat processing engine, first processing of the first user input to determine a response to the request; and sending the response to the data storage system management application.

In accordance with another aspect of the techniques herein is a computer readable medium comprising code stored thereon that, when executed, performs a method of system management comprising: receiving first user input by a chat processing engine, wherein said first user input is a natural language input to perform a request and is received from a management application used to perform data storage management; performing, by the chat processing engine, first processing of the first user input to determine a response to the request; and sending the response to the management application.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
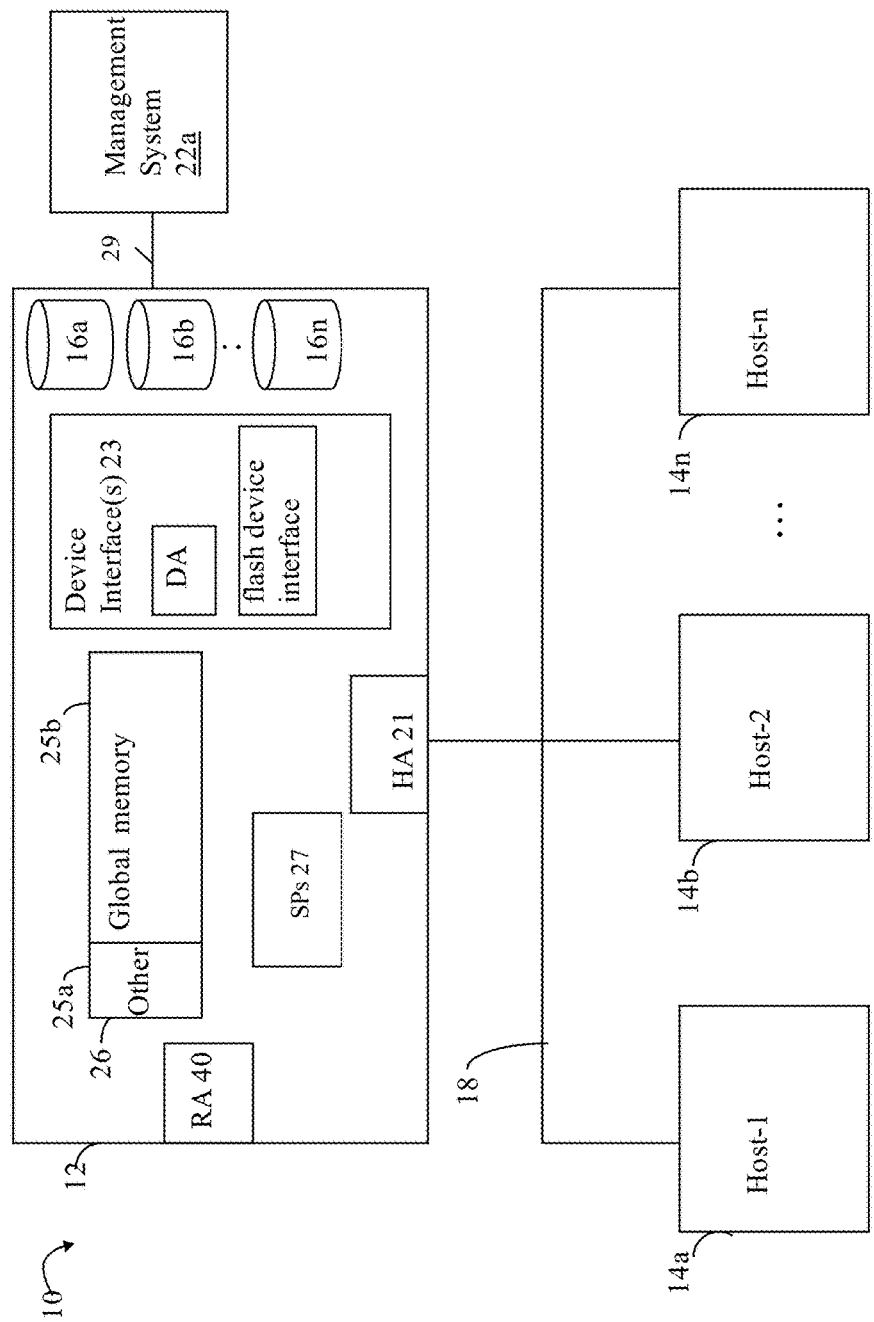
FIGS. 1, 2 and 3 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, delete a snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In at least one embodiment in accordance with techniques herein, there may be multiple data storage systems or appliances, along with possibly other components, connected in a LAN or private intranet. One or more of the data storage systems or appliances may include applications executing in a virtualized environment using virtual machines (VMs). For example, rather than have an application such as an email server application or database server application, execute on a host system where data for such application is stored on a data storage system, the application itself along with its data may reside on one or more data storage systems or appliances. In such an embodiment, the application may execute in the context of a VM on the data storage system where the application's data resides. In at least one embodiment, there may be multiple data storage systems or appliances connected in a LAN or local intranet/network whereby each such storage systems or appliances may include applications executing thereon in the context of VMs. The storage systems and appliances may be characterized as including cores or processors which are used as compute nodes, and cores or processors which are used as storage nodes. The compute nodes may be used in connection with hosting VMs executing the applications, such as the email and database server applications. The storage nodes may be used in connection with processing performed to service I/O requests, tasks and operations typically performed by data storage systems and appliances. A VM management application may be used in connection with management, tracking and movement of VMs and data between different compute nodes such as in accordance with attempts to balance workloads of the different compute nodes and/or storage nodes. For example, the VM management application may track what compute node, data storage system or appliance, a particular application is executing on in the context of a VM. As the workload of the different applications executing in the context of VMs under management by the VM management application changes over time, the VM management application may move or relocate VMs, applications, and application data among the different data storage systems (e.g., among the different compute nodes and storage nodes) in an attempt to balance workload among the different compute and storage nodes. A particular embodiment using a virtualized environment is described in more detail elsewhere herein.

In an embodiment in accordance with techniques herein, the data storage system management application (also referred to herein as the management application) may have a conversational-based UI that processes user input that is a natural language input. A natural language input may be characterized as information, such as an instruction, command, task, operation, query or question, having a form or structure of a spoken, typed or written human language. Examples of natural language inputs may include voice input or commands, text input such as via direct text entry on a UI display, email or other written communication containing text, and the like. In connection with techniques herein, the user input may be provided directly as a form of text that is a natural language input. As a variation, the user input provided may be in the form of speech or voice input which may then be converted, such as using speech/voice to text conversion software known in the art. For example, a user may provide a first natural language input in the form of voice or speech input which may be stored as an audio file. The audio file may then be converted, using speech/voice to text conversion software, to a text file that is also a natural language input (e.g., including text also having a natural language form and structure). Described below are embodiments using techniques herein whereby data storage administrators interact with the data storage management application to perform management tasks using natural language (e.g., chat-based or conversation-based) interface and input rather than generally a menu driven interface. In such an embodiment, the user does not have to locate the proper options and selections from various menus, tabs, buttons, and the like, to perform a desired question, task, command or operation. Rather, the user may provide direct natural language input which is interpreted and processed. The foregoing and other aspects of a conversational, natural language UI and associated components and processing used in connection with data storage system management are described in more detail in following paragraphs.

Figure 2:
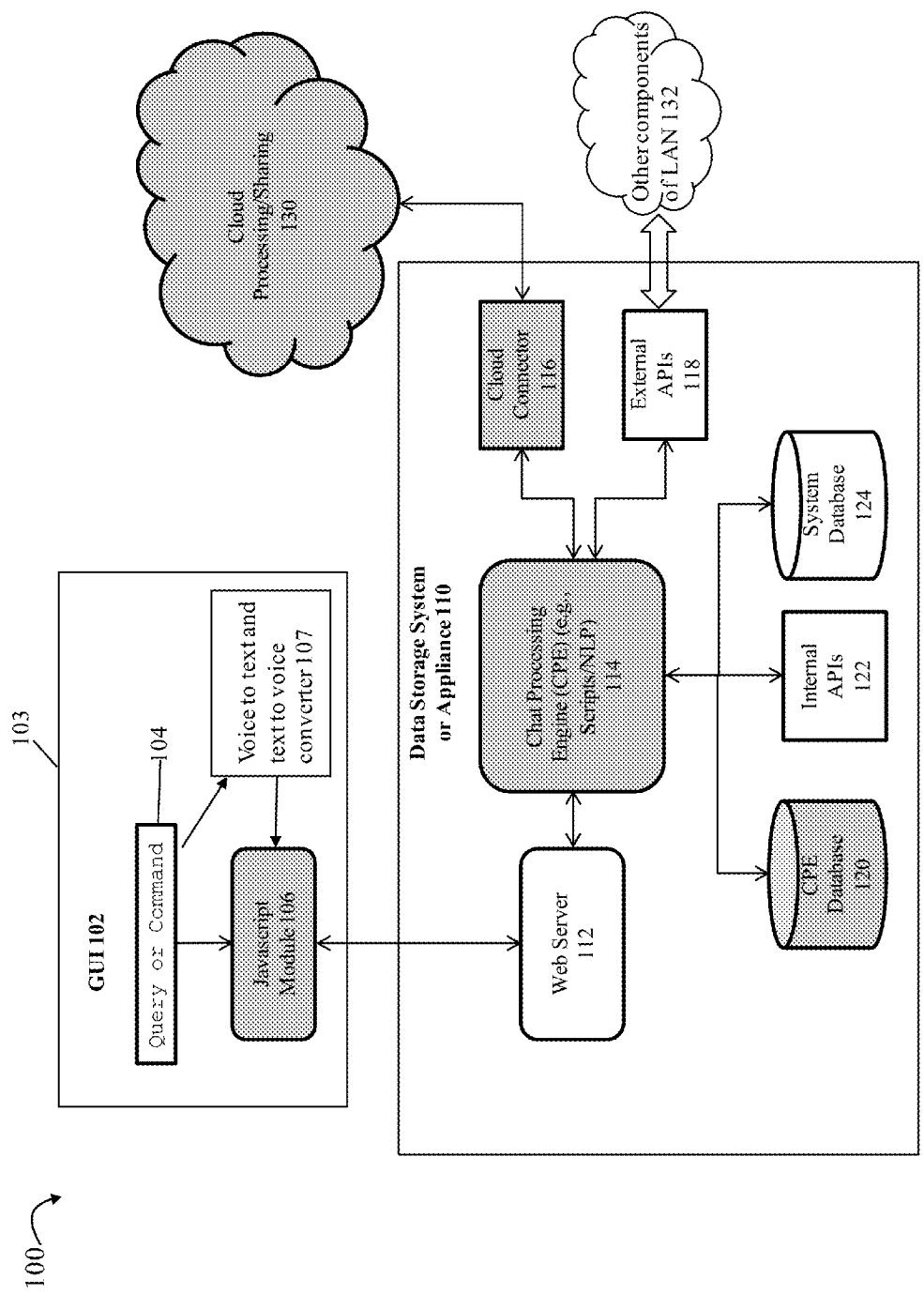

Referring to FIG. 2, shown is an example of components that may be used in an embodiment in accordance with techniques herein. The example 100 includes a GUI 102 and data storage system or appliance 110. The GUI 102 may be characterized as a client GUI of a client application 103, such as the data storage system management application described elsewhere herein. A user of the management application may enter a query or command 104 using the GUI 102 which may be communicated, using the Javascript module 106 or other code, to a webserver 112 of the data storage system or appliance 110. The GUI 102 may be characterized as a natural language-based or conversational UI whereby natural language inputs, and associated processing and components described herein, may be used in connection with management of the storage system infrastructure.

The query or command 104 may generally represent the user input. In at least one embodiment, the user input may be directly entered by the user as text in the form of a natural language input. As described above, the text may be entered, such as via typing or other manual input device. The natural language input in the form of text may be entered, for example, in a field or panel of the GUI 102. As also described herein, the user input may be a voice or speech input that may be converted, such as using converter 107, to a text form of the natural language input. Generally, the converter 107 may perform conversion from voice to text where the user input is spoken (e.g., voice or speech) and the resulting text form of the natural language input is used in subsequent processing by the chat processing engine (CPE) 114. Additionally, the converter 107 may also perform text to voice conversion for use in embodiments where the response or output to the user is also in the form of voice or speech. For example, virtual assistants or agents which communicate with users in the form of voice or spoken language include virtual assistants such as Siri on the iPhone and other products from Apple Inc., and Cortana available on products from Microsoft Corporation. Thus, an embodiment in accordance with techniques herein may accept user input generally in any one or more forms, such as text and/or voice whereby any input may be converted, as needed, to another form, such as text, which is capable of being processed and understood by other components in the embodiment, such as by the chat processing engine (CPE) 114 described below in more detail.

In an embodiment where the user input 104 is in the form of text, the input 104 may be communicated to the module 106 for forwarding to the data storage system or appliance 110. In the case where the user input 104 is in the form of voice or speech input, the user input may be converted from voice to text by converter 107 which may then send the text form of user input to the module 106 for forwarding to the data storage system or appliance 110.

It should be noted that although the converter 107 is shown on the client 103, the converter may generally be located on any suitable component. For example, the converter 107 may be located on the data storage system or appliance 110. In such a case where the user input is in the form of voice, an audio file (e.g., .wav file) may be created by the client 103 and send to the data storage system or appliance 110 where the converter 107 located thereon may convert the voice to text form of a natural language input for further processing.

In the embodiment 100, the text form of the natural language input may be received by the webserver 112 which is then forwarded to the CPE 114 for processing. The CPE 114 may analyze the text form of the natural language input by the user. Such analysis may include performing processing to infer or determine any of a command, question/query, operation, task and the like, being requested by the user. In at least one embodiment in accordance with techniques herein, the CPE 114 may perform analysis using pattern matching techniques and/or natural language processing.

Figure 2A:
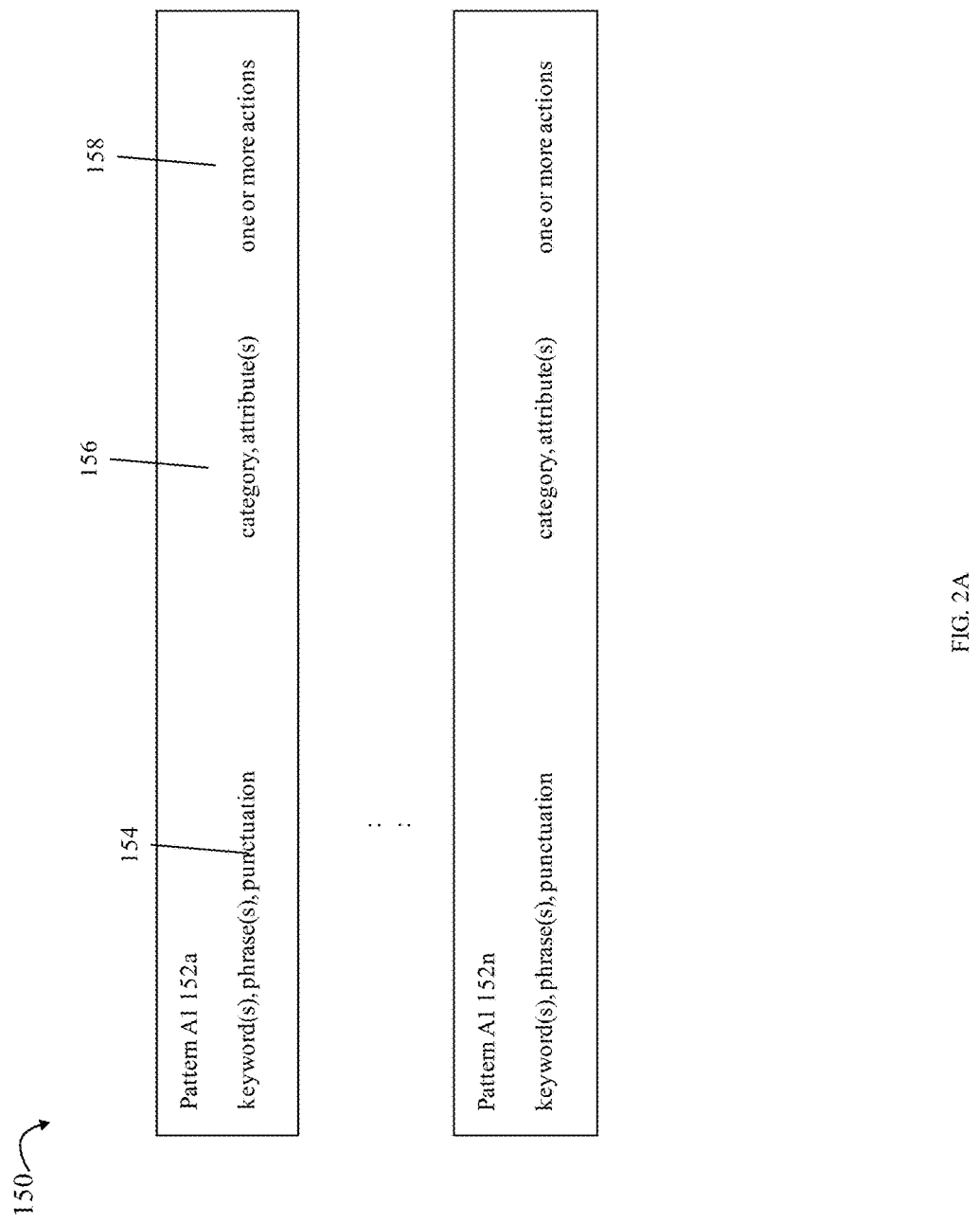
FIG. 2A is an example illustrating information that may be included in pattern templates used in an embodiment in accordance with techniques herein.

With pattern matching, the CPE 114 may use a set of predefined patterns or templates such as illustrated in the example 150 of FIG. 2A. Each of the patterns 152a-n may include, for example, any of one or more keywords, phrases, and punctuation marks 154. Each pattern may be associated with 156 one or more topics or categories and possibly one or more attributes or properties of the more general topic or category. For example, categories may include data storage system related topics or areas such as data storage provisioning for logical devices (e.g., LUNs) and/or file systems, local replication, remote replication, snapshots, data compression, list of existing problems/alerts, and the like. As an example of attributes or properties, consider a topic or category of replication. Properties or attributes may include whether the replication is local (on the same data storage system or appliance) or remote (between system or appliances), aspects regarding the replication such as frequency of replication, the source and destination/target entities (e.g., source LUN and target replicated LUN that is a copy of the source LUN), and the like. As another example of attributes or properties, consider a topic or category of provisioning storage for a LUN. Properties or attributes may include storage capacity, whether the LUN is a regular or thin (e.g., virtually provisioned) logical devices, whether the data of the LUN is encrypted or compressed, what storage tier or type of physical devices to provision storage from for the LUN, and the like. Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As described elsewhere herein, the category and/or attribute(s) 156 associated with a particular pattern 154 may be used to annotate or characterize the request and may be stored, for example, in the CPE database 120 when storing context information characterizing user interactions with the CPE 114. The category and attributes may be included in matching criteria, along with other information such as commands, queries, tasks, operations, and the like, performed by the user in different sessions to determine an existing context of the CPE database 120 matching a current context characterizing a current user request expressed using a natural language input.

The pattern 154 may also include one or more keywords or punctuation marks, that, if detected in the natural language input, may denote a question or query. For example, detection of keywords such as "help", "how", "what", and/or a questions mark "?" may denote a query or question, as opposed to a command or request to perform an operation.

Additionally, each pattern, associated category and possible attributes, may be further associated with, or mapped to, one or more actions 158 that may be taken in connection with responding to the natural language input matching a particular pattern. As an example of actions, consider snapshots as a category. Actions may include may include the particular snapshot operations or tasks, such as creating a snapshot, deleting a snapshot, setting up or modifying a schedule for creating snapshots, and the like. Actions may also include displaying a hyperlink to additional whitepapers and/or online help files regarding possible snapshot operations, tasks and information regarding snapshots and snapshot operations.

Analysis by the CPE may include determining whether there is a match between any of the predefined patterns (e.g., the keywords, phrases, and the like 154 of the pattern templates 152a-n) and the natural language input. If there is a match, the one or more actions 158 of the particular matched pattern 154 may be presented to the user in a response as possible options from which the user may select. The one or more actions 158 may generally denote one or more commands, queries/questions, task or operations that may be candidate actions performed responsive to the detected pattern (e.g., 154). If multiple actions are listed, a user may be presented with the list from which to select prior to performing further servicing of the request.

In at least one embodiment, predetermined pattern templates 152a-n comprising keywords, phrases, and/or punctuation 154, an associated category and attributes 156, and associated actions 158 may be created for various primary or common user interactions. For example, commonly performed operations may include how to reset a password, a request to display the current health of the system (e.g., display pending alerts of a particular severity or level), a request to display remaining storage capacity in the data storage system, and the like. Once a pattern of keywords, phrases and/or punctuation has been determined as a match with respect to the natural language user input, a response may be provided to the user which presents the user with the one or more possible actions from which the user may select. Depending on the particular action or option selected by the user, the user may remain in interactive (e.g., chat or conversational) natural language mode, or may change the mode of the interaction. For example, when a user is inquiring about how to reset a password or provision storage for a LUN, the user may be presented with a list of possible actions including: a hyperlink to read information about a topic, an option to remain in interactive natural language mode where the user may enter further information or details regarding the particular items of interest, or may be presented with an interactive dialog to perform a task or operation such as to proceed with resetting a particular password or provision storage for a new LUN. Thus, depending on the user selected action or option, the UI mode may stay in the chat or conversational mode with natural language, may change to menu driven mode, or may change to another suitable UI mode that may be supported.

In at least one embodiment in accordance with techniques herein, pattern matching may be performed using a scripting language, such as RiveScript (available publically at rivescript.com).

The CPE 114 may also perform natural language processing or analysis of the natural language input. As known in the art, natural language processing (NLP) is a field of computer science, artificial intelligence, and computational linguistics concerned with the interactions between computers and human (natural) languages. As such, NLP is related to the area of human-computer interaction. Many challenges in NLP involve: natural language understanding, enabling computers to derive meaning from human or natural language input; and others involve natural language generation. For example, with NLP, the user input may be processed in a manner using parsing to recognize structure associated with human natural language, such as question formation, sentence structure (e.g., nouns, verbs,), or more generally patterns and language elements expected in connection with human speech and writing. The natural language structure may be based on rules defining such structure expected in connection with human speech patterns and human natural language, such as English (e.g., the text form of the user input may be in the form of a natural language such as English).

NLP performed by the CPE 114 to analyze the natural language input may use, for example, OpenNLP by the Apache Software Foundation. The Apache OpenNLP library is a machine learning based toolkit for the processing of natural language text and supports the most common NLP tasks, such as tokenization, sentence segmentation, part-of-speech tagging/recognition, named entity extraction, chunking, parsing, and co-reference resolution. These tasks are usually required to build more advanced text processing services. OpenNLP also includes maximum entropy and perception based machine learning.

In an embodiment in which the CPE 114 analyzes the natural language input by performing NLP, a command, query, operation, task, and the like, may be inferred or determined based on the NLP results. For example, NLP may determine whether the natural language input poses a question or a command, may determine the nouns, verbs, and other parts of speech of the written human natural language input. For example, the particular nouns or verbs may be searched to determine whether the detected nouns or verbs match one or more predetermined keywords or phrases associated with a category or topic and possibly associated attributes. The foregoing matching may be similar to that as described in connection with pattern matching techniques such as in connection with FIG. 2A. Additionally, the CPE 114 may perform actions similar to those as described herein in connection with pattern matching. To further illustrate with reference to FIG. 2A, nouns, verbs, and the like, may be obtained as a result of NLP performed with respect to the user's natural language inputs. The CPE may perform processing to determine whether there is a match between the nouns, verbs, and the like, obtained as a result of NLP processing and the keywords, phrases and/or punctuation in the patterns or templates 152a-n of FIG. 2A. As described above in connection with pattern matching, a match may be made between the NLP results (e.g., nouns, verbs of natural language user input) and a pattern 154 where the pattern may be further associated with a category and attributes (156) and actions (158) for the user request. Thus, in at least one embodiment, the same set of patterns or templates of FIG. 2A may be used in connection with NLP in a manner similar to that as described above with pattern matching.

In at least one embodiment, the CPE engine 114 may utilize one or more techniques for processing the natural language user input. For example, an embodiment may perform a keyword or pattern matching technique as described above, may process the natural language input using NLP techniques as also described above, or some combination of the foregoing two techniques. For example, an embodiment may initially perform pattern matching with respect to the natural language input. If no match is determined between the user input and predetermined patterns or keywords, a second different technique such as natural language processing may be performed with respect to the natural language input.

Once the CPE 114 has inferred or otherwise determined the particular command, query, task or operation the user is requesting with the natural language input, the CPE 114 may then perform processing to service the request. In connection with servicing the request, the CPE 114 may use information obtained using one or more of: the CPE database 120, internal APIs (application programming interfaces) 122, the system database 124, external APIs 118 and the cloud connector 116.

The CPE database 120 may include CPE specific context information based on previous user interactions stored in a persistent non-volatile manner. In at least one embodiment, the CPE database 120 may include context information from previous user interactions (e.g., history of previous user interactions) retained on a per user basis, such as based on each user id (identifier) uniquely assigned to a user of the data storage management application. For each particular user, the CPE database 120 may include details regarding previous chat-based or conversation-based user interactions. For example, such information may include details regarding the particular category and attributes, and associated command, task or operation performed by the user. If the natural language input for the user is now mapped to the same category from prior interactions as stored on the CPE database for the user, such prior interactions recorded in the CPE database may provide additional details also relevant to the current user interaction or conversation (e.g., current session). For example, assume that the user previously provisioned storage for 3 LUNs and is now issuing a command to provision storage for a $4^{th}$ LUN. The current command for the 4th LUN, LUN D, may not specify all details of the provisioning command. The CPE database 120 may store information from the prior provisioning performed by the user for the 3 previously provisioned LUNs, such as options regarding different data services such as replication, compression, and encryption. The CPE database 120 may be queried to obtain such additional provisioning options previously specified by the user for the prior 3 LUNs and may be used as assumed defaults for the LUN D for which the user is now provisioning storage. The CPE 114 may obtain the foregoing defaults based on information stored in the CPE database 120 from prior LUN provisioning performed by the user, and may ask the user to confirm that LUN D is to be configured with the same or similar defaults as previously specified in connection with the prior 3 LUNs provisioned. Thus an existing context in the CPE database 120 may include one or more criteria characterizing one or more prior user interactions with the CPE 114. Information of a matching context, such as an existing context matching a current context for provisioning a LUN, may be used to further provide additional assumed details used in connection with subsequent user interactions for performing a similar provisioning task or operation. For example, the existing context may be determined as a match for the current context of the current user request expressed as a natural language input based on matching keywords, categories, commands, tasks, operations, and the like, for "provisioning" or "provision" and "LUN". The natural language input may not specify details regarding the particular selections for data services such as replication, compression and encryption. However, the existing context may store additional information regarding such data services related to the 3 previously provisioned LUNs by the user and such details may be assumed as defaults when provisioning storage for the $4^{th}$ LUN D.

Based on the previously saved context information for a user as stored in the CPE database 120, a particular level of expertise or general level of knowledge may also be inferred. The foregoing may be used by the CPE 114 to, for example, rank or present the various possible actions 158 to the user, screen or filter out particular actions or options (e.g., if the user is a beginner or novice, actions or options ranked as expert level may not even be presented to the user), and the like. The general level of knowledge or expertise may be based on one or more indicators of information retained in the CPE database 120 such as, for example, the number of prior sessions, the length of such sessions or interactions, the particular operations, tasks or commands previously performed by the user, the number of times a user has performed a particular operation, task or command, and the like. Different commands, tasks or operations may be associated with a predetermined level of knowledge or expertise. For example, configuring a RAID group or specifying particular command options may be associated with an expert or intermediate level of expertise. In contrast, resetting a password may be associated with a novice or beginner level of expertise.

As also described elsewhere herein, the CPE database 120 may be continually updated by the CPE 114 as additional information is obtained on each user through subsequent chat-based or conversational based interactions with the CPE 114.

Internal APIs 122 may be APIs invoked by the CPE 114 locally in the same storage system or appliance as the CPE 114. The internal API may report or return information such as regarding the status of particular physical and logical entities of the data storage system or appliance 110 (e.g., the amount of unused capacity of a particular LUN, storage pool, or RAID group; information regarding the health of a particular physical drive or device or other physical component).

External APIs 118 may be APIs invoked by the CPE 114 to obtain information from 132 another storage system, appliance or component that is external with respect to the system or appliance 110, and also where the 132 other storage system appliance or component is included in the same LAN, intranet or private/local network as the system 110. For example, as described elsewhere herein, there may be multiple data storage systems, appliances, and computer systems connected in a LAN or private network (e.g., such as a private network of a company). An external API may be invoked by the CPE 114, for example, to obtain information about components and entities of other data storage systems or appliances, network switches, and the like, in the same LAN, intranet or private/local network as the data storage system or appliance 110.

The CPE 114 may query the system database 124 to obtain information in connection with servicing a request specified as a natural language input. The system database 124 may describe the current data storage system configuration such as, for example, the currently defined physical and logical entities in the data storage system 110, health and status information regarding the physical and logical entities in the system 110, historical or trend information regarding health and status of physical and logical entities at various prior points in time, and the like. The information in the systems database 124 may also include information regarding other data storage systems or appliances configured in the same LAN. To further illustrate, the system database 124 may identify the physical storage devices and RAID groups existing in the system 110 (and properties about such physical storage devices and RAID groups), and what LUNs are provisioned (and properties about such LUNs such as capacity, whether virtually provisioned/thin or thick).

The CPE 114 may communicate over the cloud connector 116 to other external systems, sites or components over the public internet or network. For example, assume the system or appliance 110 is a customer system. In this case, the CPE 114 may use cloud connector 116 to communicate with a vendor-provided website over the internet to request information and/or report or store information to the vendor provided website. For example, the data storage system vendor providing the customer's system 110 may be queried to determine whether there are any software updates that should be applied to the customer's system 110, and to access a vendor's database to obtain information collected across multiple different customer systems (e.g., problems reported across similar systems by multiple customers, solutions provided to other customers with similar problems as those of the current system 110, and the like). Information may be collected regarding the system 110 and reported to the vendor-specific website such as for storing in the vendor-specific database. Such information may relate to the health and status of the system 110 and its components and may be stored in the vendor's database of aggregated customer problems and solutions. Information reported to and stored on the vendor's website may be used, for example in connection with remotely performed data analysis and mining by the vendor.

Thus, in connection with a natural language input received from a user of the data storage management application 103, the CPE 114 may obtain information using any one or more of the CPE database 120, internal APIs 122, system database 124, external APIs 118 and the cloud connector 116. Additionally, the CPE 114 may perform multiple calls or inquiries to one or more of the foregoing in connection with servicing a request. In at least one embodiment, the general flow in connection with a natural language input received by the CPE 114 may include performing either pattern matching or NLP as described above to infer, derive or determine any of a command, query, task, or operation being requested. As a next step, the CPE 114 may query the CPE database 120 to determine whether there is any previous context for the particular user that matches information of the current request. (e.g., any previous context in the CPE database 120 that matches the current user, as well as any of the particular category, possible attributes and associated one or more actions mapped to the particular category for the current request specified via the current natural language input). If there is a match in the CPE database 120, additional information may be obtained from the previous matching context for the user and added as assumed defaults to the current request. The user may be asked to confirm that the assumed defaults also apply to the current request before servicing the request based on such assumed defaults. Assuming either confirmation is received or the user further clarifies details regarding the current request, the CPE 114 may perform processing to service the request (e.g., issue the requested command or query, or perform the requested task or operation). If no matching context is found in the CPE database 120 and the CPE 114 has sufficient information to proceed with the request, the CPE 114 may perform processing to service the request (e.g., issue the requested command or query, or perform the requested task or operation).

In connection with servicing the request, consider the following examples. As a first example, the natural language input from the user may be determined by the CPE 114 as requesting the remaining capacity of all RAID groups configured in the system 110. To determine this amount, the CPE 114 may first issue multiple internal API calls 122 to determine an amount of unused capacity in each RAID group, and then aggregate or add all such unused capacity amounts of all RAID groups. The aggregated amount of unused storage capacity may be included in a formulated natural language text response (e.g., "There are 2 terabytes of unused storage capacity in all configured RAID groups on the data storage system.") returned to the data storage management application 103 for display to the user.

In connection with any requests or commands issued by the CPE 114 in servicing the request, such requests or commands issued via external APIs 118 or over the cloud connector 116 may be generally characterized as control path commands or requests.

In one aspect, techniques herein may be used to provide feedback per user by reading previously saved context information from, and updating existing context information stored in, the CPE database 120. Additionally, techniques herein provide feedback whereby existing patterns, associated categories, attributes and actions, and the like (e.g., as in connection with FIG. 2A) may be updated or modified based on subsequent user interactions. For example, a first set of patterns, associated categories, attributes and actions may be generated and used by the CPE 114 in connection with pattern matching and/or NLP analysis of a natural language user input. At a second later point in time, additional keywords or actions may be associated with different categories based on additional information derived from subsequent user interactions. Thus, at the second point in time, a second set of updated patterns, associated categories, attributes and actions may be generated and provided over cloud connector 116 by the vendor website to the CPE 114 for use in connection with pattern matching and/or NLP analysis of a natural language user input.

Figure 3:
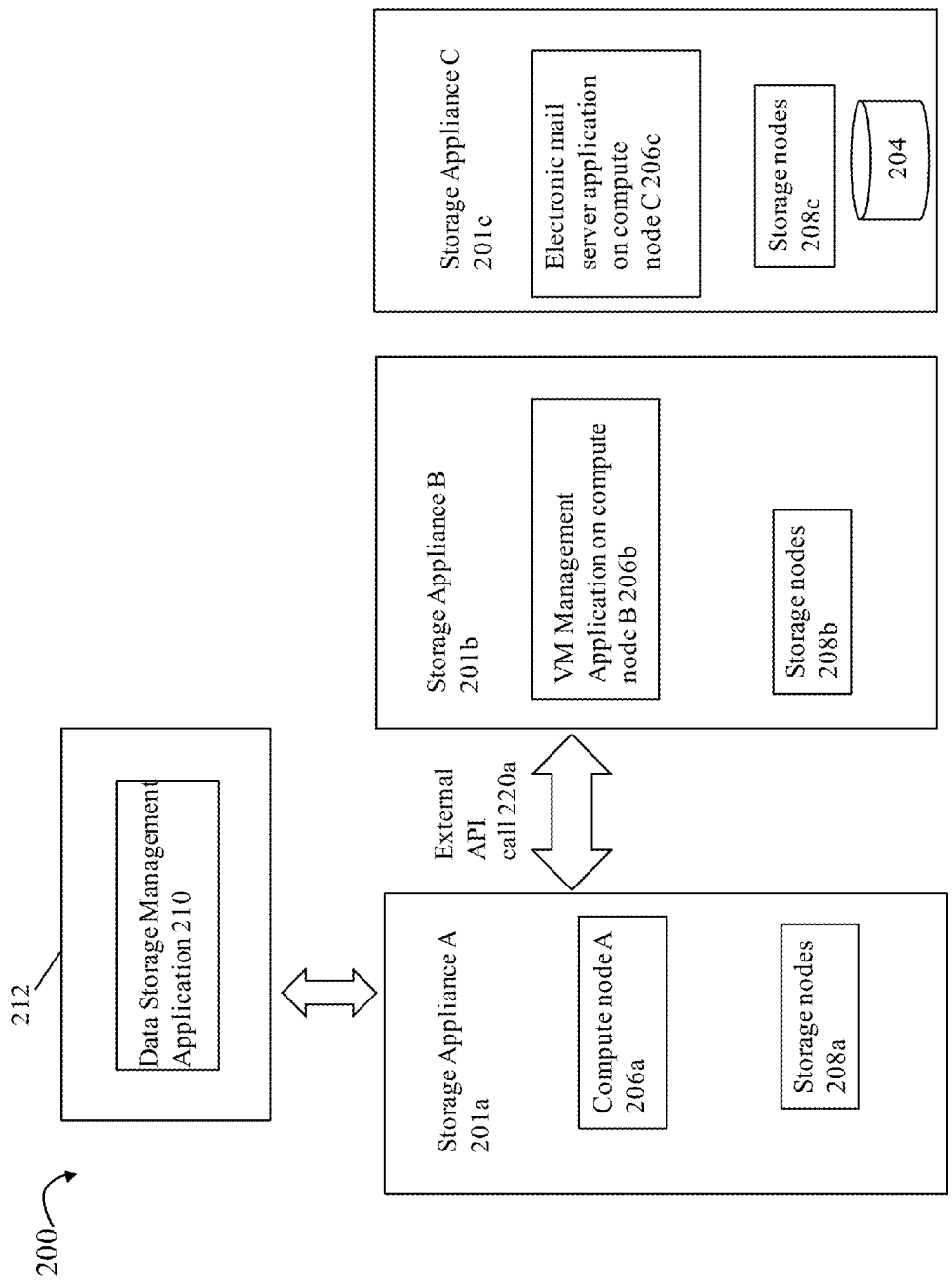

What will now be described with reference to FIG. 3 is an example 200 illustrating use of techniques herein in connection with an embodiment of a LAN or intranet configured with 3 storage appliances or systems. The example 200 includes a client computer system 212 with the data storage management application 210 executing thereon in a manner similar to that as described in connection with the application 102 of FIG. 2. The user of the application 210 may issue a request in the form of a natural language input provided to the storage appliance A 201a. The storage appliance A 201a may include components similar to system or appliance 110 of FIG. 2. It should be noted that details of 210, 212 and 201a, as well as storage appliances 201b and 201c are omitted for simplicity of illustration but may include components as described elsewhere herein.

In the example 200, the storage appliances 201a-c may be included in the same LAN or private network/intranet over with external API calls may be issued, such as by appliance 201a, to obtain information regarding other components, such as storage appliances 201b and 201c, in connection with servicing the user request, such as a text form of a natural language input processed by the CPE 114 of storage appliance 201a. VMs may exist across storage appliances 201a-c whereby 201a-c may include multiple compute nodes and storage nodes. For example, appliance 201a may include compute node A 206a and storage nodes 208a, appliance 201b may include storage nodes 208b and compute node B 206b, and appliance 201c may include storage nodes 208c and compute node C 206c. Element 204 may denote the data stored on appliance 201c where such data is used by the email application executing in the context of a VM on compute node 206c. Each of the foregoing 3 compute nodes 206a-c may potentially be used in connection with executing applications in the context of VMs as described above. In this example 200 at a point in time, compute node 206a may not have any VM and application executing thereon, compute node 206b may have a VM management application executing thereon, and compute node 206c may have an electronic mail server executing thereon in the context of a VM. The VM management application executing on node B 206b may be an application used to manage and balance execution of the various VMs executing on the compute nodes 206a and 206c forming a cluster of compute nodes upon which VMs may execute. As described elsewhere herein, the VM management application may be used in connection with management, tracking and movement of VMs and data between different compute nodes such as in accordance with attempts to balance workloads of the different compute nodes and/or storage nodes. For example, the VM management application may track what compute node, data storage system or appliance, a particular application is executing on in the context of a VM. As the workload of the different applications executing in the context of VMs under management by the VM management application changes over time, the VM management application may move or relocate VMs, applications, and application data among the different data storage systems (e.g., among the different compute nodes and storage nodes) in an attempt to balance workload among the different compute and storage nodes.

In connection with the example 200, a user may enter a question in text form into the GUI of the application 210 which asks "What do I need to do today?". The foregoing text form of the natural language input from the user may be provided to the CPE of the appliance 201a for processing which determines, using pattern matching or NLP as described above, that the natural language input specifies a standard user inquiry serviced by performing a variety of different queries. The CPE queries the CPE database for an existing context for the user matching the current context of the current request as expressed using the natural language input.

Consistent with discussion elsewhere herein, if matching context is found in the CPE database providing additional details that may be useful in connection with the current request, the additional details may be retrieved from the CPE database and used to formulate a response sent to the user asking for confirmation or clarification regarding whether the additional details are applicable to the current request. The user may subsequently respond providing confirmation or clarification and the CPE may proceed. If no matching context is found in the CPE database, the CPE may proceed with directly processing the request without any additional information.

In connection with the environment of the example 200 and the particular user that manages the cluster of compute nodes in the virtualized environment, the CPE of appliance 201a may perform the following queries, such as in parallel:

a). perform an external API call 220a to the VM management application executing on compute node 206b inquiring whether there are any major alarms/alters for the compute node cluster (e.g., any of compute nodes 206a-c) managed by the user.

b). perform one or more internal API calls within the appliance 201a inquiring regarding any alarms/alerts/problems that may impact the compute node cluster.

c). perform a query of the system database of appliance 201a as to whether there are any historical trends that may indicate a possible occurrence of an event today on any of the storage appliances 201a-c.

d). perform a remote query over the cloud connector to a remote website, such as a vendor of the appliances 201a-c inquiring whether there are any available software updates for software currently installed on the appliances 201a-c.

The CPE on the appliance 201a may obtain information returned from the above a)-d) processing and store it as updated information in the CPE database for the current user. The CPE may also formulate a response to the user based on the collected return information from the above processing of a)-d). which includes the following text "I looked across your environment and found 13 issues. Do you want me to tell you about the most severe issue first, the oldest issue first or would you like the full list?" The user may enter another input in reply such as "full list". In response, the CPE returns the entire list of problems, issues, and events obtained as a result of performing a)-d) above. The foregoing list may be displayed in text form to the user. In at least one embodiment, the user may also be presented with an option to selectively export the list in the form of an email to the user.

Thus, techniques herein may be used to allow a user to interact with the data storage system management application by entering questions or commands in the form of a natural language. The techniques herein may be used, for example, to ask for help (e.g., "how do I provision a LUN?", "where can I find system alerts?") request information about the storage environment or configuration (e.g., "what LUNs have I provisioned?", "are there any software updates available?"), inquire regarding trouble shooting failures (e.g., "why is a physical device XXX offline?"), and perform commands or operations (e.g., "I want to provision a LUN" which may be following up with a series of additional questions from the CPE to obtain additional pieces of information such as "how much storage capacity do you want the LUN to have?", "what name do you want to specify for the LUN?"). Such techniques may be used in an embodiment without requiring the user, for example, to initially navigate to a particular page, or make a particular series of menu selections.

What will be now be described are flowcharts of FIGS. 4 and 5 summarizing processing described herein.

Figure 4:
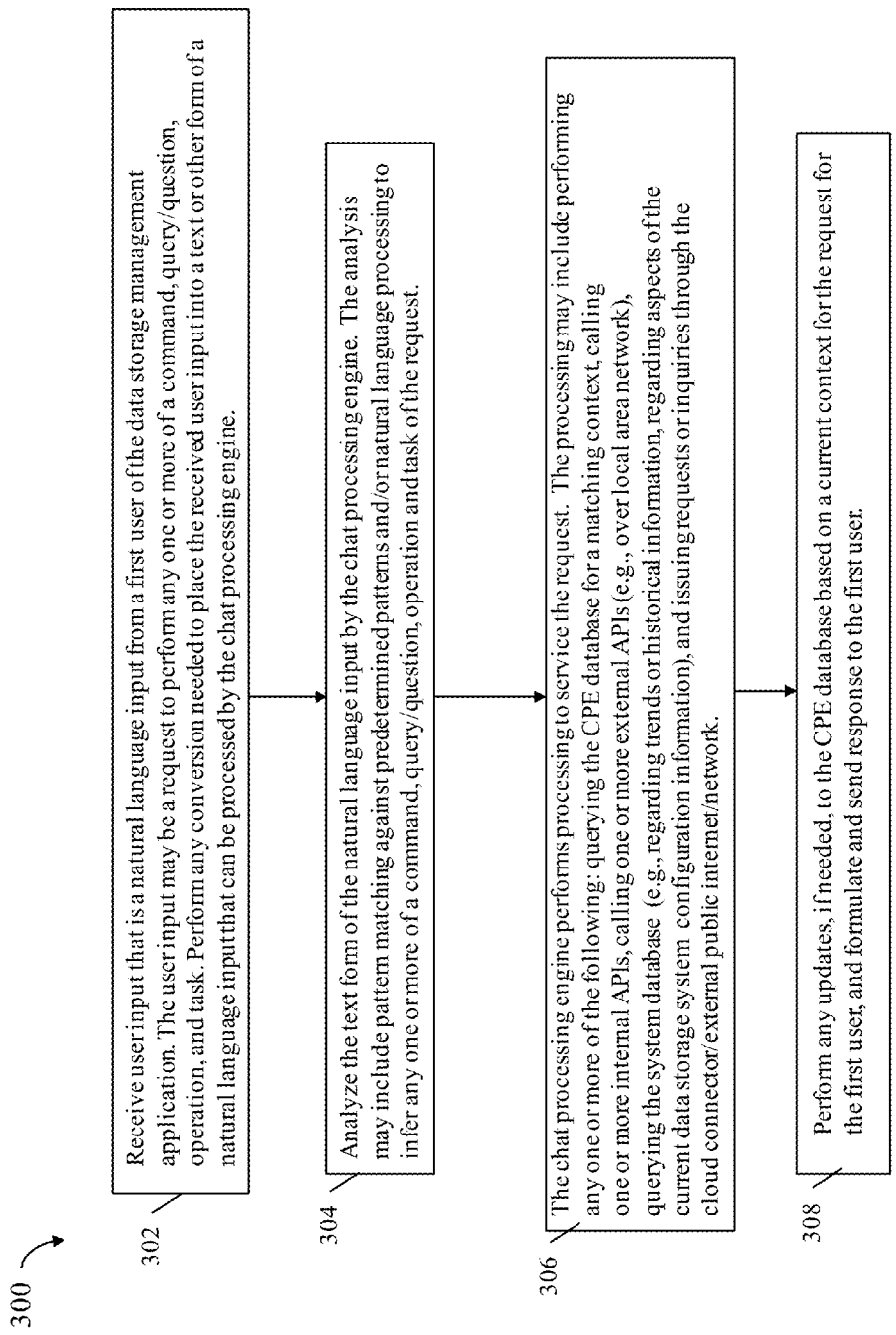
FIGS. 4 and 5 are flowcharts or processing steps that may be performed in an embodiment in accordance with techniques herein.

Referring to FIG. 4, shown is a first flowchart 300 of processing steps that may be performed in an embodiment in accordance with techniques herein. At step 302, user input may be received that is a natural language input from a first user of the data storage management application. The user input may be a request to perform any one or more of a command, query/question, operation, and task. Step 302 may include performing any conversion needed to place the received user input into a text or other form of a natural language input that can be processed by the CPE. At step 304, the CPE analyzes the text form of the natural language input provided by the first user. The analysis may include pattern matching against predetermined patterns and/or natural language processing to infer any one or more of a command, query/question, operation and task of the request. At step 306, the CPE performs processing to service the request. The processing of step 306 may include performing any one or more of the following: querying the CPE database for a matching context, calling one or more internal APIs, calling one or more external APIs (e.g., over local area network), querying the system database (e.g., regarding trends or historical information, regarding aspects of the current data storage system configuration information), and issuing requests or inquiries through the cloud connector/ external public internet/network. It should be noted that step 306 may also include obtaining additional information from the user needed to clarify or otherwise perform the user's request. For example, as described above, step 306 may include obtaining relevant context information from the CPE database to obtain additional information for the request, obtaining clarification or confirmation from the user regarding the additional information as relevant to the current user request, and then performing additional processing (e.g., internal APIs, external APIs, obtaining information from the system database or via the cloud connector) for servicing the user request as expressed in the form of the natural language input received in step 302. Step 306 may also include interactions with the user to select a particular action from multiple possible actions as may be the case where a predetermined pattern is associated with, or mapped to, multiple possible actions from which the user may select.

Step 308 may then be performed which includes performing any updates, if needed, to the CPE database based on a current context for the request for the first user, and formulating and sending a response to the first user for the request. As also described above, step 308 may include multiple iterations and/or interactions between the user and the CPE such as inquiring from the user how to rank, filter or display the requested results.

Figure 5:
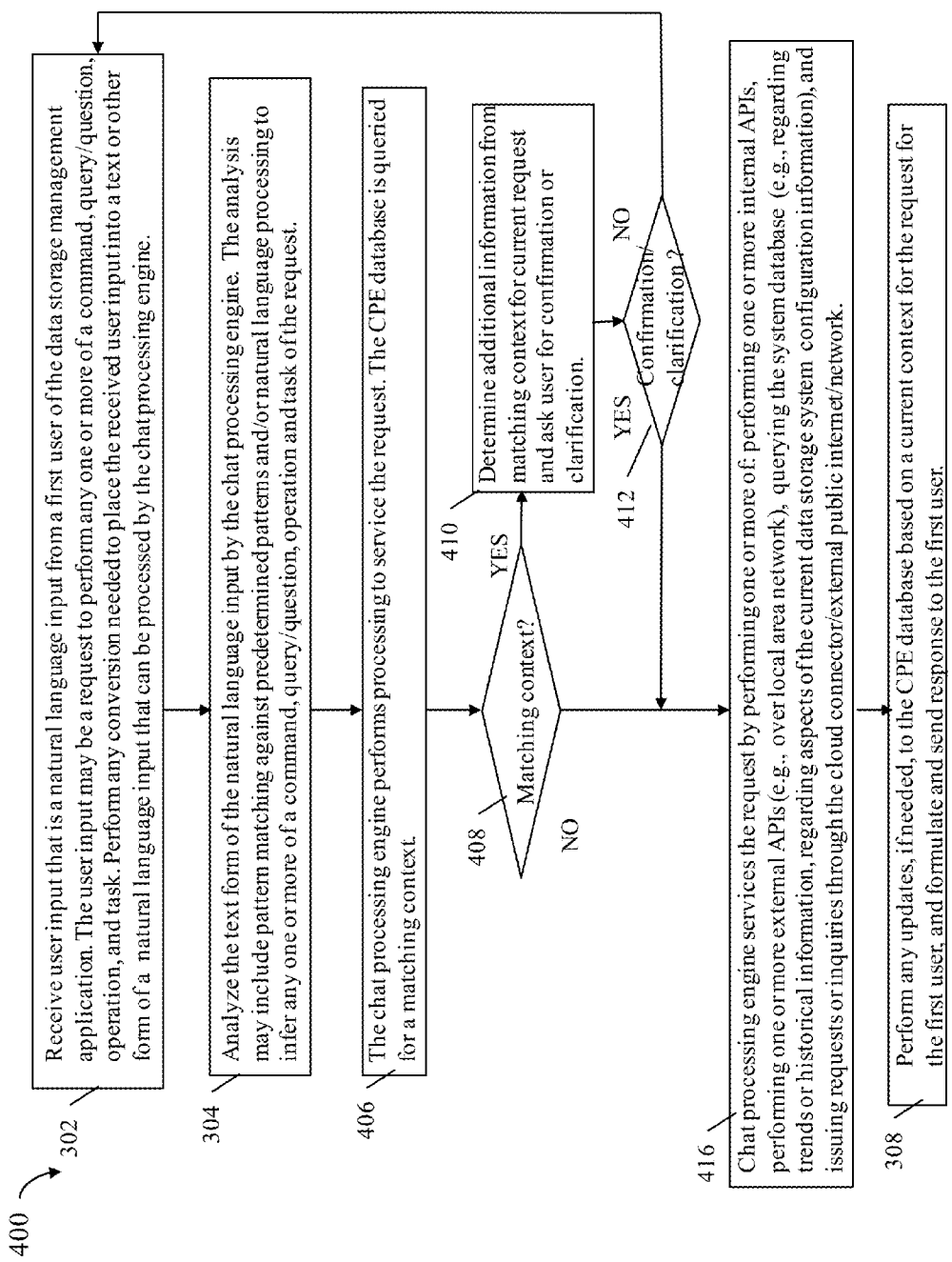

Referring to FIG. 5, shown is a second flowchart 400 of processing that may be performed in an embodiment in accordance with techniques herein. The flowchart 400 provides more detail regarding processing steps that may be performed in servicing a user's request expressed in the form of a natural language input. The flowchart 400 includes steps 302 and 304 as described above in connection with FIG. 4. After step 304, step 406 may be performed where the CPE performs processing to service the request whereby the CPE database is queried for any matching context for the current user (e.g., existing context in the CPE database matching the current request). At step 408, a determination is made as to whether a matching context was found in the CPE database. If step 408 evaluates to yes, control proceeds to step 410 where additional information may be derived from the matching context found in the CPE database where the additional information may be relevant to the current user request. Step 410 includes asking the user for confirmation or clarification regarding whether the additional information is relevant to the current request. At step 412, it is determined whether the user, through one or more interactions, has provided sufficient confirmation or clarification for the CPE to process the request. If step 412 evaluates to yes, control proceeds to step 416. If step 412 evaluates to no, the user may cancel the current request and control may return to step 302. If step 408 evaluates to no, control proceeds to step 416.

At step 416, the CPE performs further processing to service the request by performing one or more of: performing one or more internal APIs, performing one or more external APIs (e.g., over local area network), querying the system database (e.g., regarding trends or historical information, regarding aspects of the current data storage system configuration information), and issuing requests or inquiries through the cloud connector/external public internet/network. Subsequently step 308 may be performed as described in connection with FIG. 4.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing system management comprising:

receiving, using a processor, first user input by a chat processing engine, wherein said first user input is a natural language input to perform a request and is received from a user interface of a management application used to perform data storage management of a data storage system, wherein said first user input includes a first command and is received from a first user, and wherein first context information for the first user includes different command options specified by the first user in connection with prior interactions in which the first user previously issued the first command;

performing, by the chat processing engine and using a processor, first processing of the first user input to determine a response to the request;

sending, using a processor, the response to the user interface of the management application, wherein said first user input and the response are transmitted over a data storage system management control path that is used for data storage system management and control commands, wherein said data storage system management control path is separate from a data path over which I/O operations are issued to access data stored on the data storage system; and performing second processing to service the request in accordance with the first context information for the first user, wherein the first user input omits a first option for the first command and said second processing includes determining a first value for the first option for the first command, wherein said first value is included in the first context information for the first user, the first value being previously specified by the first user in connection with the prior interactions in which the first user previously specified the first command.

2. The method of claim 1, wherein the first user input includes any of a data storage management command or a data storage management query.

3. The method of claim 1, further comprising:
receiving first voice input; and
performing voice to text conversion of the first voice input and generating the first user input comprising text of a natural language.

4. The method of claim 1, wherein said natural language input includes text having a structure based on rules of a written or spoken human language.

5. The method of claim 1, wherein said first processing includes:
determining whether the first user input matches a predetermined pattern associated with at least one command, query, operation or task; and
responsive to determining the first user input matches the predetermined pattern, determining that the first user input is requesting to perform the at least one command, query, operation or task associated with the predetermined pattern.

6. The method of claim 5, wherein the predetermined pattern is a first of a plurality of predetermined patterns associated with multiple candidate actions including any of: multiple commands, multiple queries, multiple operations and multiple tasks, and the method includes the user selecting one of the multiple candidate actions to be taken in connection with servicing the request.

7. The method of claim 6, wherein each of the plurality of predetermined patterns includes any of: one or more predetermined keywords, one or more phrases, and one or more punctuation marks.

8. The method of claim 5, further comprising:
forming the response, wherein the response includes a natural language response asking for confirmation that the first user input is requesting to perform the at least one command, query, operation or task associated with the predetermined pattern.

9. The method of claim 5, wherein the first command is the at least one command, query, operation or task associated with the predetermined pattern.

10. The method of claim 9, wherein the first user input is received at a first data storage component that is any of the data storage system and a data storage appliance having storage managed using the management application, and wherein said second processing includes performing any one or more of:
performing a first call in accordance with a first application programming interface to obtain first information internal within the first data storage component, said first information used in connection with servicing the request;
performing a second call in accordance with a second application programming interface to obtain second information from another component that is external from the first data storage component and included in a same local area network as the first data storage component, said second information used in connection with servicing the request;
obtaining third information from a system database, said third information including any of: current data storage system configuration information describing physical and logical entities in a data storage network comprising the first data storage component, and historical information denoting previously observed state information of components of a data storage network comprising the first data storage component, said third information used in connection with servicing the request; and
obtaining fourth information over an available public network, said fourth information used in connection with servicing the request.

11. The method of claim 9, wherein the second processing includes:
determining any of a category and an attribute associated with the request; and
querying a chat processing engine database for an existing context that matches the request, wherein the existing context is the first context for the first user.

12. The method of claim 11, wherein the existing context includes information for one or more previous sessions of the first user with the management application regarding any of a same command, same query, same operation, same task, same category, and same attribute of the request.

13. The method of claim 1, wherein said first processing includes performing natural language processing of the first user input, said natural language processing comprising:
parsing the first user input and determining one or more nouns and one or more verbs;
determining, based on the parsing, at least one command, query, operation or task being requested by the first user input; and
performing the second processing to service the request in accordance with the at least one command, query, operation or task requested by the first user input.

14. The method of claim 13, wherein the first user input is received at a first data storage component that is any of a data storage system and a data storage appliance having storage managed using the management application, and wherein said second processing includes performing any one or more of:

performing a first call in accordance with a first application programming interface to obtain first information internal within the first data storage component, said first information used in connection with servicing the request;

performing a second call in accordance with a second application programming interface to obtain second information from another component that is external from the first data storage component and included in a same local area network as the first data storage component, said second information used in connection with servicing the request;

obtaining third information from a system database, said third information including any of: current data storage system configuration information describing physical and logical entities in a data storage network comprising the first data storage component, and historical information denoting previously observed state information of components of a data storage network comprising the first data storage component, said third information used in connection with servicing the request; and obtaining fourth information over an available public network, said fourth information used in connection with servicing the request.

15. The method of claim 13, wherein the second processing includes:
  determining any of a category and an attribute associated with the request; and
  querying a chat processing engine database for an existing context that matches the request, wherein the existing context is the first context for the first user.

16. The method of claim 15, wherein the existing context includes information for one or more previous sessions of the first user with the management application regarding any of a same command, same query, same operation, same task, same category, and same attribute of the request.

17. A system comprising:
  a client system including a data storage system management application executing on a processor of the client system; and
  a data storage system component including one or more processors and a memory, wherein the memory include code that, when executed, performs a method of system management comprising:
    receiving, using a processor, first user input by a chat processing engine, wherein said first user input is a natural language input to perform a request and is received from a user interface of a management application used to perform data storage management of the data storage system component, wherein said first user input includes a first command and is received from a first user, and wherein first context information for the first user includes different command options specified by the first user in connection with prior interactions in which the first user previously issued the first command;
    performing, by the chat processing engine and using a processor, first processing of the first user input to determine a response to the request;
    sending, using a processor, the response to the user interface of the management application, wherein said first user input and the response are transmitted over a data storage system management control path that is used for data storage system management and control commands, wherein said data storage system management control path is separate from a data path over which I/O operations are issued to access data stored on the data storage system component; and
    performing second processing to service the request in accordance with the first context information for the first user, wherein the first user input omits a first option for the first command and said second processing includes determining a first value for the first option for the first command, wherein said first value is included in the first context information for the first user, the first value being previously specified by the first user in connection with the prior interactions in which the first user previously specified the first command.

18. A non-transitory computer readable medium comprising code stored thereon that, when executed by a processor, performs a method of system management comprising:
  receiving, using a processor, first user input by a chat processing engine, wherein said first user input is a natural language input to perform a request and is received from a user interface of a management application used to perform data storage management of a data storage system, wherein said first user input includes a first command and is received from a first user, and wherein first context information for the first user includes different command options specified by the first user in connection with prior interactions in which the first user previously issued the first command;
  performing, by the chat processing engine and using a processor, first processing of the first user input to determine a response to the request;
  sending, using a processor, the response to the user interface of the management application, wherein said first user input and the response are transmitted over a data storage system management control path that is used for data storage system management and control commands, wherein said data storage system management control path is separate from a data path over which I/O operations are issued to access data stored on the data storage system; and
  performing second processing to service the request in accordance with the first context information for the first user, wherein the first user input omits a first option for the first command and said second processing includes determining a first value for the first option for the first command, wherein said first value is included in the first context information for the first user, the first value being previously specified by the first user in connection with the prior interactions in which the first user previously specified the first command.

* * * * *